(12) United States Patent
McNiece

(10) Patent No.: US 7,092,344 B2
(45) Date of Patent: Aug. 15, 2006

(54) APPARATUS FOR CREATING A MULTI-DIMENSIONAL DATA SIGNAL

(75) Inventor: Robert G. McNiece, Austin, TX (US)

(73) Assignee: Lucere Enterprises, Ltd., Lago Vista, TX (US)

(*) Notice: Subject to any disclaimer, the term of this patent is extended or adjusted under 35 U.S.C. 154(b) by 0 days.

(21) Appl. No.: 10/731,784

(22) Filed: Dec. 9, 2003

(65) Prior Publication Data

US 2004/0208108 A1 Oct. 21, 2004

Related U.S. Application Data

(60) Provisional application No. 60/463,744, filed on Apr. 18, 2003.

(51) Int. Cl.
  *G11B 7/00* (2006.01)
(52) U.S. Cl. .................................... 369/94; 369/112.15
(58) Field of Classification Search ................ 369/103, 369/44.37, 124.02, 124.03, 94; 356/125, 356/317, 318; 250/339.11, 339.12, 201.5, 250/458.1
  See application file for complete search history.

(56) References Cited

U.S. PATENT DOCUMENTS

| | | | | |
|---|---|---|---|---|
| 4,176,252 A | | 11/1979 | Dutkovich | .................. 179/1 G |
| 5,258,970 A | | 11/1993 | Kobayashi | .................. 369/109 |
| 5,267,051 A | | 11/1993 | Dellert et al. | ............... 358/426 |
| 5,319,629 A | | 6/1994 | Henshaw et al. | ........... 369/103 |
| 5,412,631 A | * | 5/1995 | Komma et al. | .............. 369/103 |
| 5,434,426 A | | 7/1995 | Furuyama et al. | ........... 250/551 |
| 5,446,565 A | * | 8/1995 | Komma et al. | .............. 369/103 |
| 5,526,182 A | | 6/1996 | Jewell et al. | ................ 359/621 |
| 5,532,998 A | * | 7/1996 | Durham | ..................... 365/125 |
| 5,598,393 A | * | 1/1997 | Alon et al. | .................. 369/103 |
| 5,627,805 A | * | 5/1997 | Finkelstein et al. | ..... 369/124.09 |
| 5,764,603 A | | 6/1998 | Glaser-Inbari | ........... 369/44.23 |
| 5,784,352 A | * | 7/1998 | Swanson et al. | ............... 369/94 |

(Continued)

FOREIGN PATENT DOCUMENTS

EP 0 507 304 A2 2/1992

(Continued)

OTHER PUBLICATIONS

Towery, Christopher and Dowdell, E. Alan; "Advanced Optical Fiber for Long Distance Telecommunication Networks"; paper presented at AMTC 2000; 10 pages.

(Continued)

*Primary Examiner*—Thang V. Tran
(74) *Attorney, Agent, or Firm*—John A. Fortkort; Fortkort & Houston P.C.

(57) ABSTRACT

An optical disk drive (101) is disclosed which has essentially no seek time. The drive utilizes a Virtual Head (VH) (103) which is capable of accessing any and/or all tracks in an optical disk (111) at any time. The drive utilizes a procedure by which all of the tracks (208) in an optical disk are continuously mapped to a detector (121) space at all times, thus making data stored on the disk drive available almost instantaneously. The mapping of the optical disk tracks to the sensor space is direct in that it is predetermined and is an integral part of the driver software. The direct mapping makes it possible to use the least amount of computation time required to access any track. The technique is enabled by using a combination of a holographic lens element (125) with the detector. The technique and the components used in this device open the possibility for rapid data transfers using multidimensional data access.

34 Claims, 4 Drawing Sheets
(4 of 4 Drawing Sheet(s) Filed in Color)

U.S. PATENT DOCUMENTS

| | | | |
|---|---|---|---|
| 5,815,293 A * | 9/1998 | Komma et al. | 369/103 |
| 6,040,578 A * | 3/2000 | Malin et al. | 250/339.12 |
| 6,137,763 A * | 10/2000 | Dahan et al. | 369/124.08 |
| 6,198,557 B1 | 3/2001 | Dultz et al. | 359/127 |
| 6,219,311 B1 | 4/2001 | Mitsuno | 369/32 |
| 6,229,771 B1 * | 5/2001 | Kosoburd et al. | 369/44.37 |
| 6,236,483 B1 | 5/2001 | Dutt et al. | 359/136 |
| 6,291,132 B1 | 9/2001 | Glushko et al. | 430/270.15 |
| 6,519,340 B1 | 2/2003 | Javidi | 380/28 |
| 6,525,862 B1 | 2/2003 | Fisher et al. | 359/278 |
| 6,590,852 B1 * | 7/2003 | McCormick, Jr. | 369/112.23 |
| 6,614,730 B1 * | 9/2003 | Vo-Dinh | 369/126 |
| 6,704,104 B1 * | 3/2004 | Li | 356/317 |
| 6,798,547 B1 | 9/2004 | Wilson et al. | |
| 6,811,764 B1 | 11/2004 | Jorgensen et al. | |
| 6,825,960 B1 | 11/2004 | Curtis et al. | |
| 6,847,498 B1 | 1/2005 | Curtis et al. | |
| 2001/0012246 A1 | 8/2001 | Mitsuno | 369/32 |
| 2001/0048977 A1 | 12/2001 | Dorozhkina et al. | 427/487 |
| 2002/0089912 A1 | 7/2002 | Kobayashi | 369/53.23 |
| 2002/0181781 A1 | 12/2002 | Javidi et al. | 382/210 |
| 2003/0058782 A1 | 3/2003 | Kondo | 369/275.4 |
| 2003/0123116 A1 | 7/2003 | Shuman | |
| 2003/0152393 A1 | 8/2003 | Khoury | 398/207 |
| 2004/0126701 A1 | 7/2004 | Lee et al. | 430/270.15 |
| 2004/0257962 A1 | 12/2004 | Walker et al. | 369/112.23 |
| 2005/0018316 A1 | 1/2005 | Curtis et al. | |

FOREIGN PATENT DOCUMENTS

| | | |
|---|---|---|
| JP | 63298213 A | 12/1988 |
| JP | 2000230815 A | 8/2000 |
| WO | WO 99/34358 | 7/1999 |

OTHER PUBLICATIONS

Sangwine and Ell, "Hypercomplex Auto- and Cross-Correlation of Color Images"; Poster presented at IEEE Intl. Conference on Image Processing (ICIP '99), Kobe, Japan, Thursday, Oct. 28, 1999; one page.

Wainner, Scott, Comdex Fall '00 Spotlight: Fluorescent Multilayer Optical (FMD); www.sysopt.com.articles/c3d-spot; 4 pages.

Detofsky, Abram et al., Equivalency-processing parallel photonic integrated circuit (EP31C): equivalence search module based on multiwavelength guided-wave technology; Applied Optics, vol. 39, No. 5, Feb. 10, 2000, pp. 818-826.

Classification of Ploarization; http://hyperphysics.phy-astr.gsu.edu/hbase/phyopt/polclas.html; Dec. 22, 2004; 4 pages.

Simoncelli, Ero P., "Design of Multi-Dimensional Derivative Filters"; Published in First IEEE Intl. Conf. on Image Processing, Austin, Texas, vol. I, pp. 790/793, Nov. 1994; 6 pages.

Srakaew, Sanan et al., "A Parallel Model for Multimedia Retrievial Based on Multidemensional Signal Structure"; Dept. of Electrical Engin. and Computer Science, George Washington University, Washington, DC 20052; 4 pages.

Choo, Peng Yin et al., A Multi-Wavelength Optical Content-Addressable Parallel Processor (MW-OCAPP) for High-Speed Parallel Relational Database Processing: Architectural Concepts and Preliminary Experimental System; white paper; The University of Arizona, 14 pages.

* cited by examiner

APPARATUS FOR CREATING A MULTI-DIMENSIONAL DATA SIGNAL

CROSS-REFERENCE TO RELATED APPLICATIONS

This application claims priority to U.S. Ser. No. 60/463,744, filed Apr. 18, 2003, entitled "Apparatus for Generating a Multi-Dimensional Binary Data Signal," having the same inventors, and is incorporated herein by reference in its entirety.

TECHNICAL FIELD OF THE INVENTION

The teachings disclosed herein relate generally to data storage devices and methodologies, and more particularly to devices and methodologies for generating, storing, retrieving, and manipulating multi-dimensional data signals.

BACKGROUND OF THE INVENTION

Data storage devices are an essential element of any computer system. These devices have evolved to the point where enormous amounts of data may be stored on these devices and retrieved as needed.

FIG. 1 depicts the functional configuration of a conventional static storage device. The device 11 employs a mechanical head 13 that uses monochromatic radiation 15 to transfer static information from or to a location on a storage medium 17. To gain access to any given data, this mechanical head must traverse along a path defined with respect to the radius and length of the surface of the medium, seeking out the location of the recorded information desired. The time required for this mechanical device to traverse from one location on the storage medium to the next is referred to as "seek time".

A signal is generated from static data off the surface of the storage medium 17 in linear, sequential fashion with the aid of the mechanical head 13. This signal is then transmitted for the purpose of being acted upon, manipulated by some means, or held in volatile memory.

Information is typically stored in data storage media as binary data. Binary data is typically represented by either a zero or a one, and is known as a bit. Data of this type may be either static or dynamic. Data which resides in a volatile state and which is being processed, transmitted, or otherwise acted upon, such as the data residing in Random Access Memory (RAM), is often referred to as dynamic data. By contrast, data which resides in a non-volatile state, such as the data residing on magnetic tape, magnetic disks, optical disks, and other such non-volatile media, is often referred to as static data.

Structured data, or information, is transmitted from one point to another as data signals. These binary data signals, which typically take the form of energy pulses, are generated for the purpose of storing, retrieving, processing, and transmitting information in the form of bits, bytes, words, packets, and the like. These signals (also called bit streams) are bit patterns that are structured sequentially, that is, structured linearly in one dimension. Hence, an energy pulse may be used to represent a bit of data within a bit stream that can be interpreted as logical lexicons such as "on or off", "yes or no", "0 or 1", "true or false", or any other type of discreet Boolean expression. Parallel bit streams are multiple sequential bit patterns that require independent channeling per bit stream. Nonetheless, the signal generated is structured linearly and in one dimension. For example, an eight-bit word is based on two discreet binary states to the power of three ($2^3$) The maximum number of unique combinations in such a word is sixty-four, and each of those sixty-four binary structures would be represented as some combination of these binary states in sequence (e.g., as 10110011). A simple method to represent this value would be to generate eight energy pulses with this sequence in a specified time. The signal is represented dimensionally as eight to the power of two, as this energy pulse is in either of two discrete Boolean states as noted above.

Conventional CD disks of the type presently available have about 3.52 inches of active area. In this area, there are about 64 thousand concentric circular tracks (about 16000 tracks per inch). The tracks in a conventional optical disk are similar to the grooves in a vinyl record in that a single long line contains all of the active information. Each track is about 0.6 micron wide, and the distance between tracks is about 1.6 micron. Data from the spiral track is in the form of depressions, called "pits", and flat areas, called "lands". To extract information from an optical disk, a laser is focused through a set of optics onto the tracks. The light reflected from the track will determine if the incident light has landed on a pit or a land. In particular, a pit will disperse the incident light almost completely, while a land will reflect light back. The incident light is passed through a one way mirror disposed at an angle to the incident beam so that light reflected from the track surface will be redirected towards a set of photodiodes for sensing and tracking.

Binary data passing within the area illuminated by the laser is accessed sequentially as the medium rotates, and a signal is subsequently generated which comprises logical, sequential bits that are to be interpreted. This reflected signal, containing the desired binary information, is collected linearly (that is, in one dimension). An electro-optic device mounted on the mechanical mechanism follows this track until the task of accessing the end of the desired recorded information is achieved, a process which can take several rotations of the medium to complete. Once the correct information has been located from the medium, conventional optical devices increase the rotational speed of the medium in order to access the data faster.

The time it takes to acquire the recorded static information from the surface of the medium is referred to as "access time", and is a function of the rotational speed of the medium and of the electro-optics employed. When multiple requests to the same device occur, the time required for one process to complete before the next request can commence is known as the "lag time."

Presently, the primary limitation in information retrieval speeds of conventional optical disk drives is seek time. This limitation is the principle reason why data transfer rates do not increase linearly as a function of disk rotation speed. In fact, tests have shown that the 24x optical disks currently available exhibit an improvement in operating performance of only about 20% when compared to 12x optical disks, rather than the approximately 100% improvement that might be expected if seek time were not a factor. The primary reason for slow seek times arises from conventional optical disk drive technology. While current optical disk drives are simple in design and construction, their performance is severely limited by the spatial distance the drive head has to cover, using a motor and gear mechanism, in order to access data located over several different tracks.

Another factor that reduces data retrieval speeds arises when multiple requests for data are sent to a single device. The submission of multiple requests has the effect of increasing the lag time and creating a bottleneck. Unfortunately, any decrease in data retrieval speeds can result in significant performance degradation in equipment which relies for its operation on the data retrieved from the data storage device. Typically, increasing the rotational speed of the data storage medium will not, by itself, compensate for increases in seek times and lag times.

Some attempts have been made to improve information retrieval speeds by constructing optical disk drives which utilize multiple mechanical devices or electro-optic heads to access multiple recorded informational areas. However, the additional cost in parts and electronic overhead makes this approach cost prohibitive for most applications. Other devices are provided with "look-ahead" algorithms to achieve some level of parallel accessing. However, the performance increases achievable with these devices are only incremental, and therefore do not adequately address the above noted problems.

There is thus a need in the art for methodologies for maximizing the performance and minimizing the seek time, access time, and lag time of optical disk drives and other memory devices. There is also a need in the art for memory devices which utilize such methodologies. These and other needs are met by the methodologies and devices disclosed herein and hereinafter described.

SUMMARY OF THE INVENTION

In one aspect, a method for accessing data from a data storage device is provided. The method comprises the steps of directing electromagnetic radiation onto the surface of the data storage medium/media, and receiving, as a multi-dimensional data stream, reflections of the electromagnetic radiation from the storage medium/media.

In some embodiments, prior to being directed onto the surface of the data storage device, the electromagnetic radiation is transformed into a hologram comprising a series of patterns. This hologram may encompass, but is not limited to, lines, dots, or combinations thereof. This transformation may be achieved, for example, by a holographic lens element, and the reflection of the hologram may be captured by a CMOS or CCD photo diode array or by other suitable detectors. However, one skilled in the art will appreciate that other linear detector arrays or ensuing technologies may also be used for this purpose, and there use is contemplated herein.

In other embodiments, the reflected electromagnetic radiation is transformed into a hologram comprising a series of line patterns after being directed onto the surface of the data storage device, after which the reflection of the hologram may be captured by a CMOS or CCD photo diode array.

The multidimensional data stream preferably comprises binary data. In some embodiments, the data storage device, which is preferably a static storage device, may comprise at least first and second data storage media, and a plurality of data tracks may be accessed on the first and second storage media simultaneously and in parallel.

In another aspect, a method for generating a multidimensional data signal is provided. The method comprises the steps of generating a first signal from an electromagnetic radiation source, directing the first signal onto the surface of a data storage device, and receiving a second, multi-dimensional signal from the data storage device. The data captured is preferably binary data.

The method may further comprise the step of manipulating the second signal into at least two combinations of measurable parameters selected from the group consisting of, but not limited to, length, width, height, radius, angle, spatial dimensions, and time. The method may also comprise the step of measuring the second signal. The data storage device preferably comprises at least one static storage medium, and the first signal preferably bisects the at least one static storage medium. The at least one static storage medium may comprise first and second static storage media, and the method may further comprise the step of accessing multiple data tracks on the first and second storage media simultaneously and in parallel.

In yet another aspect, a data retrieval system is provided which comprises a data storage medium, a sensor array, a mirror, and a holographic lens element adapted to cooperate with said mirror so as to generate a hologram in the form of multiple data patterns that are focused upon said sensor array.

In some embodiments, the holographic lens element is adapted to receive electromagnetic radiation reflected from said data storage medium or media and is further adapted to generate, from the reflected electromagnetic radiation, a hologram in the form of multiple data patterns that are focused upon said sensor array.

In other embodiments, the system further comprises a source of electromagnetic radiation, such as a monochromatic or polychromatic laser source, and the holographic lens element is adapted to receive electromagnetic radiation from said source and is further adapted to generate, from the electromagnetic radiation, a hologram in the form of multiple data patterns that are focused upon said data storage medium. Preferably, the data patterns are line patterns, the data storage medium comprises a plurality of tracks, and each of the data patterns corresponds to electromagnetic radiation reflected from one of said plurality of tracks. In some embodiments, the bit patterns on the surface of the disk or storage medium may be multidimensional bit patterns. The storage medium may be preformatted in a multidimensional format (the header files may also be in this format). Either or both of the input and output signals in the system may also be multidimensional.

The data retrieval system may further comprise a source of coherent electromagnetic radiation, and a beam splitter which is adapted to receive electromagnetic radiation from the source and is further adapted to split the electromagnetic radiation into a plurality of multiple beams. The data storage medium may comprise a plurality of optical disks, and the data retrieval system may be constructed such that each of the plurality of beams impinges upon one of the plurality of optical disks.

In still another aspect, a device is provided which comprises a source of an electromagnetic radiation signal, a reflective element adapted to direct the electromagnetic radiation signal onto the surface of a data storage device, a second element adapted to capture binary data in multiple dimensions from the data storage device, medium, or media, transporting means for transporting data in multiple dimensions, manipulating means for manipulating said electromagnetic radiation into any given minimum two combinations of measurable dimensions relating to length, width, height, radius, angle, spatial dimensions, or time, and measuring means for measuring said electromagnetic energy. The data storage device may comprise a static or dynamic storage medium or media. In some embodiments, the data storage device can be adapted to simultaneously read to and write from the data storage medium or media.

In another aspect, a device for generating a multidimensional signal is provided. The device comprises a source of electromagnetic radiation, capturing means for capturing binary data in multiple dimensions from a static storage device, medium, or media, transporting means for transporting data in multiple dimensions, manipulating means for manipulating said electromagnetic radiation into any given minimum two combinations of measurable dimensions relating to length, width, height, radius, or angle, and measuring means for measuring said electromagnetic energy. The signal is preferably convertible to a static state and a dynamic state, and can preferably be measured dimensionally by a function of binary data, by some function of binary bit(s) in relation to time, or by some function of binary bit(s) in relation to space or any combination thereof. The signal may also comprise and be measured by any given number of bits of information in relation to combinations of space and time, or may be manipulated or processed mathematically with linear or non-linear, parallel, or multidimensional algorithms.

One skilled in the art will appreciate that the storing, retrieving, processing, and transmitting of a multidimensional data signal has substantial benefits and can offer significant performance improvements in devices that access data from optical media. Accordingly, the present disclosure provides a means of increasing data at any given time, lowering costs in generating information, decreasing or eliminating input/output bottlenecks, improving static and dynamic data functionality in performance (typically by orders of magnitude), providing a greater level of security for information, and providing a greater degree of data integrity. Still further advantages of the devices and methodologies disclosed herein will become apparent from a consideration of the ensuing description and accompanying drawings.

One skilled in the art will appreciate that the various aspects of the present disclosure may be used in various combinations and sub-combinations, and each of those combinations and sub-combinations is to be treated as if specifically set forth herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

A. Overview

Figure 1:
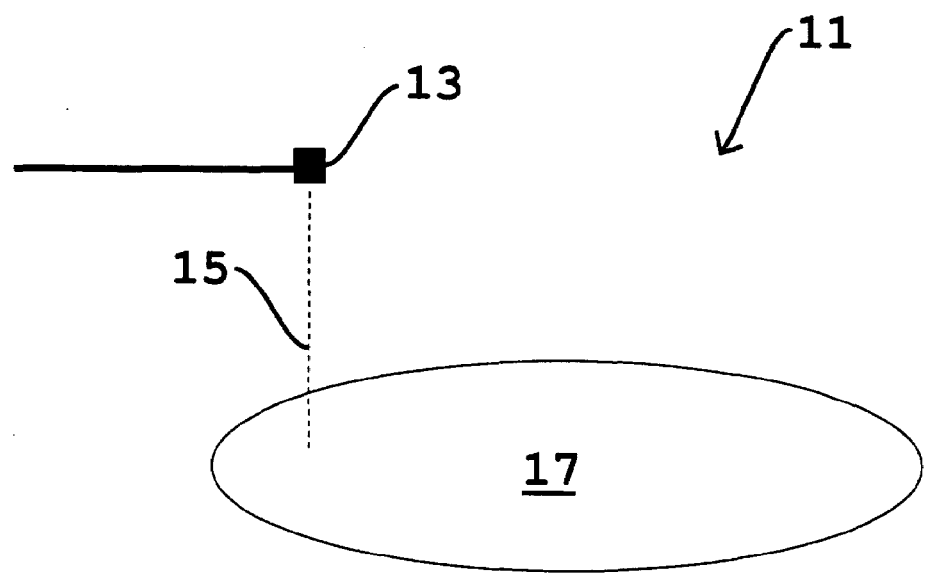
FIG. 1 is an illustration of a conventional data storage device.

In accordance with the teachings herein, methodologies and devices are provided that maximize the performance and minimize the seek time, access time, and lag time of optical disk drives and other memory devices. In particular, a novel disk drive design is provided herein which eliminates moving parts from the drive head and which increases data transfer rates by several orders of magnitude. Various methods which utilize, or which may be implemented by or used in conjunction with, this disk drive design are also disclosed.

In some embodiments of the disk drive design disclosed herein, the drive accesses data simultaneously from several tracks or locations on one or more optical disks or other optical data storage medium, thus eliminating or greatly reducing seek times. This design enables multidimensional data access, wherein burst reads can make data transfers within a single signal from several tracks simultaneously, in parallel, wherein single and/or multiple bits per track can be illuminated with the read head, and wherein the principle limitation in data access rates is the processing electronics. The methodologies and devices disclosed herein maximize the performance of data storage units and the devices that utilize them, and may be used to minimize or eliminate seek time, access time, and lag time in such devices.

Methodologies and devices are also disclosed herein which utilize multidimensional signals to store, retrieve, process, and transmit information and its components. By contrast, conventional telecommunications, network infrastructures, and digital environments typically store, transfer, and manipulate bits of information in one dimensional, linear terms.

The novel disk drives disclosed herein allow data to be available instantaneously or simultaneously from static storage media. Consequently, seek time and lag time are essentially eliminated, while access speeds are limited only by the latency (that is, the time it takes for a specific block of data on a data track to rotate around to the read/write head) of the media. The resultant signal that is generated from the modified device is multidimensional and hence has a more complex structure than the signals generated in conventional data storage technologies. This multidimensional signal may be transmitted and/or manipulated in a variety of ways. Furthermore, a signal of this type enables the use of multidimensional formatted media or matrices for storing, retrieving, processing, and transmitting data relative to a given task and state of the data.

The above noted means for accessing any and/or all tracks of the medium at any given time preferably includes a signal source referred to herein as a Virtual Head (VH). When the signal source is a source of electromagnetic radiation, the VH may be referred to as a "Virtual Optical Head" (VOH). It will be appreciated, of course, that various signal sources can be used in the devices and methodologies described herein, including, but not limited to, acoustic, microwave, short or long wavelength radio, or x-ray signal sources.

In order to generate the complex signal, the VH bisects the diagonal or radius of the data storage media at some given distance perpendicular, or near perpendicular, to the media surface, thus allowing all data to be accessed in one half to one rotation of the media. The return signal is a multidimensional signal comprising binary data that can boost system performance by several orders of magnitude compared to conventional data storage devices.

When the virtual head is applied to a single medium, the format is commonly a two dimensional signal generated over time, but the signal could also have 3 or more dimensions. If N multiple media are utilized, a signal having N or greater dimensions can be generated over time. The mathematical difference between the information conveyable using conventional one-dimensional technology, and that conveyable using a multi-dimensional approach of the type disclosed herein, can be appreciated with reference to TABLE 1, which shows a comparison of the possible unique permutations for an n-dimensional eight-bit data array or "word" based on 2 discreet binary states, wherein all dimensions have a maximum equivalent value and time t is constant:

TABLE 1

Possible Permutations in n-Demensional Words

| Dimensions | Permutations |
|---|---|
| 1 | 64 |
| 2 | 4096 |
| 3 | 262144 |

The details of some aspects of the devices and methodologies used to implement this approach are described in greater detail below and with respect to the specific, non-limiting embodiments depicted in the figures.

Figure 2:
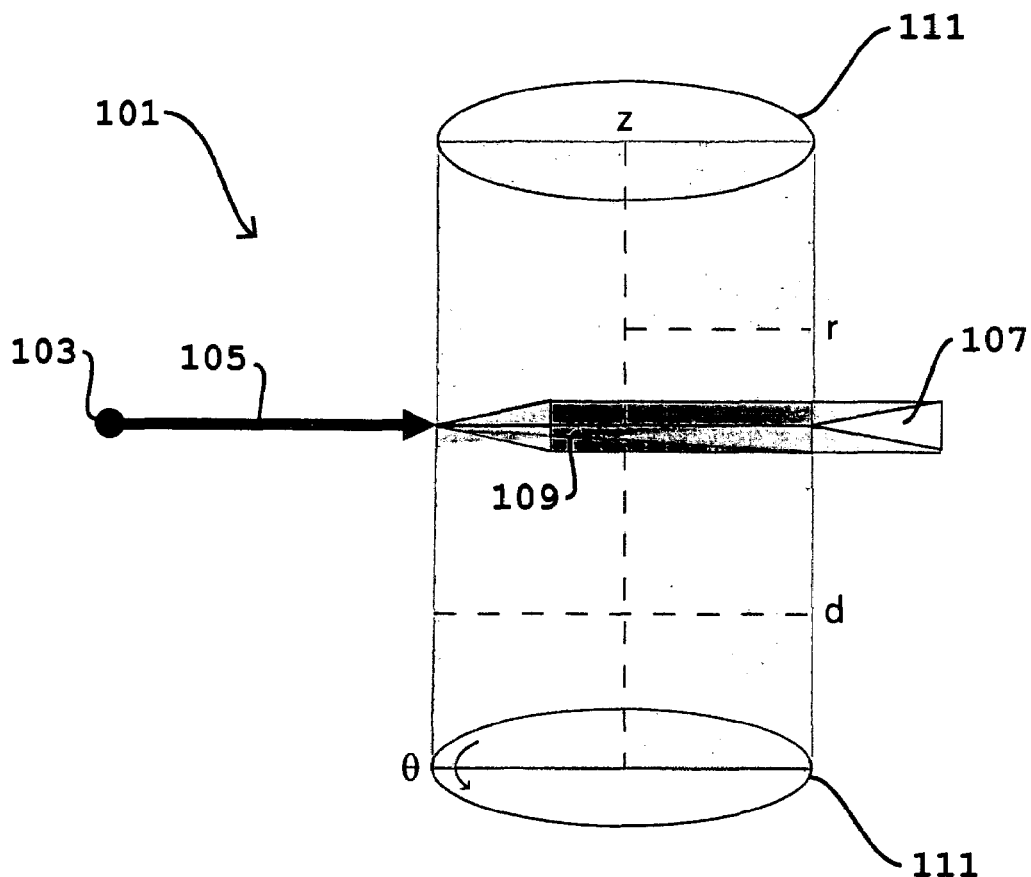
FIG. 2 is a ray tracing showing a generated source of coherent electromagnetic radiated energy interacting with a mirror component (the mirror component inverts the electromagnetic radiated energy) and bisecting perpendicularly two optical disks.

FIG. 2 illustrates one particular embodiment of a data storage device made in accordance with the teachings herein. The data storage device 101 comprises a source 103 of coherent electromagnetic radiation 105. As noted above, the source may be a component of the virtual optical head. The electromagnetic radiation generated by this source may be referred to as the transmission signal, and can be characterized by various quantitative features, such as, for example, wavelength, frequency, power, and geometrical spatial distribution.

The electromagnetic radiation from the source is shown interacting with a mirror component 107. The ray tracing shows the direction of the initial transmitting signal inverted vertically in the z direction, with width x of the original signal divided over a given length xy 109. Since the width of the original generated signal is now the length of xy, the electromagnetic radiation bisects perpendicularly the diagonal (equal to d or xy) of the static storage media 111 which, in the particular embodiment depicted, comprises two optical disks.

The mirror component is preferably adapted to reflect the electromagnetic radiation at two times the angle of incidence, and to elongate the electromagnetic radiation by some given length xy. The length xy is preferably a minimum of the radius or diagonal of the optical disk or other storage media. In some embodiments, positive and negative vertical values may be created simultaneously with this component.

Figure 3:
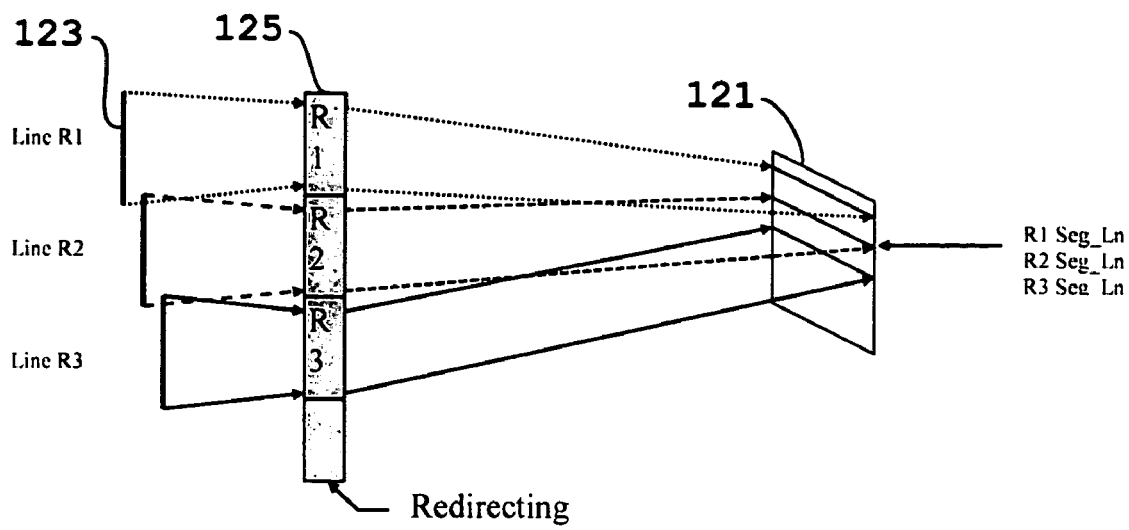
FIG. 3 is an illustration depicting the reflected energy source of FIG. 2 from a multifaceted mirror component or passing through a Holographic Optical Element (HOE) and striking a detector with the data pattern captured from the media in a recognizable pattern.

As previously noted, the electromagnetic radiation strikes and illuminates the optical disks 111 (which contain static data) perpendicularly or near perpendicularly, bisecting the radius/radii or diagonal/diagonals over given special domains measured in two/three dimensions, respectably. This illuminated space of coherent, electromagnetic energy captures data stored on the surface of the optical media and reflects it back according to the angle of incidence. This multidimensional, reflected signal passes through a hologram for the purpose of segmenting the signal. This segmented, multidimensional, coherent electromagnetic energy may be imaged on a detector 121 or sensor as shown in FIG. 3. The detector may be, for example, a CCD or CMOS detector. Other components may be employed for optimal focusing, alignment, and other purposes.

FIG. 3 shows the return signal (second signal) reflected from the optical disk by way of mirror component 107 of FIG. 2. The reflected signal is now a Multidimensional Data Signal (MDS) 123 which passes through a Holographic Optical Element (HOE) or multifaceted, segmented mirror component 125 prior to striking the detector 121. The second signal is now segmented and aligned upon a sensor array. When the MDS impinges upon the detector, it is encoded with the data pattern captured from the data storage media 111 (see FIG. 2) in some recognizable pattern.

Figure 4:
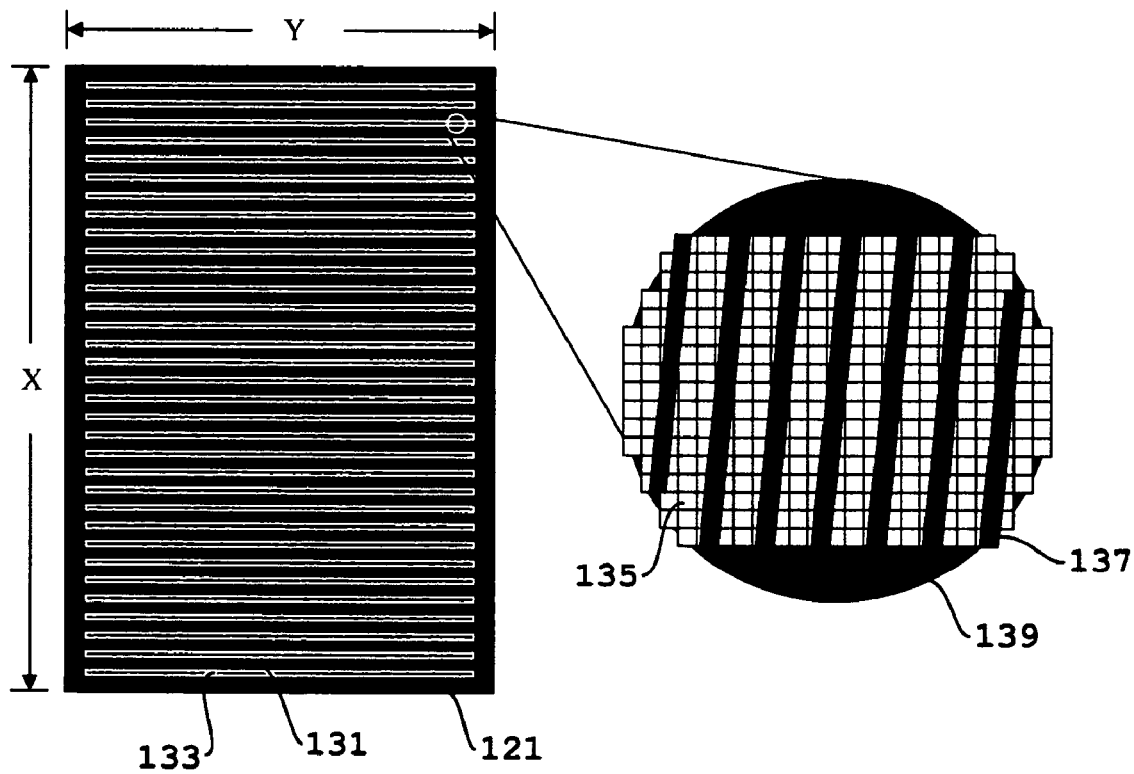
FIG. 4 is an illustration showing the illumination of multiple data tracks on a storage medium upon an imager.

FIG. 4 is an illustration of a magnified perspective of the reflected signal imaged upon the detector 121. The segmented reflected radiation (second signal) is measured dimensionally by the Cartesian coordinates (xy). The radiation illuminates the static data stored on the surface of the data storage media and captures simultaneously multiple data tracks, and can capture single or multiple binary bits of data. The amount of data captured may be measured in terms of the number of bits of data within the mathematical domain $\{x, y; r, \theta\}$. As illustrated in FIG. 4, MDS light areas 133 represent the reflected signal segmented upon the imager, while the dark areas 131 represent separations between segmentations of the second signal. In a magnified perspective 139 shown to the right, each of the light areas 133 contain multiple data tracks 135 while the dark areas 137 indicate the adjacent lines or dead space between tracks. When multiple disks are illuminated, the amount of data captured may be represented mathematically, in some instances, by the three-dimensional domain $\{x, y, z; z, r, \theta\}$.

In the preferred embodiment, a source of electromagnetic radiation, which is preferably a laser, is used to generate the signal that perpendicularly bisects the optical disks or other static data storage media, thereby resulting in multiple data tracks being accessed simultaneously, at the speed of light, and in parallel. This aspect of multidimensional signal generation can be achieved either through holographic means or by way of a properly designed mirror component. This signal source of electromagnetic radiation captures binary data in multiple dimensions from the surface of the medium (media) and returns this pattern by reflection. The reflected MDS can be transmitted through space and/or inverted to accommodate transmission via optical fiber, by microwave transmission, through acoustic transmission, or through other suitable means, and can be captured on a Charged Couple Device (CCD), a CMOS detector array, or by other suitable means.

The signal which bisects the optical disk(s) or other static data storage media can be of a variety of geometrical patterns and can be of variable width, height, length, and intensity. The signal can be pulsed, quasi-pulsed, modulated or continuous, and be generated in any frequency of the electromagnetic spectrum. The return, reflected, multidimensional binary signal will vary with binary data as the media rotates over time. The static medium or media can be horizontal, vertical, or any degree off axis and can rotate at a set, variable or any combination of speeds. The data on the static media can be stored in a linear or multidimensional format. The MDS can be processed or manipulated linearly or multi-dimensionally with the appropriate algorithms. Notably, the MDS can be treated with current, linear means resulting in linear computations.

B. Novel Disk Drive Design

1. Overview

Figure 5:
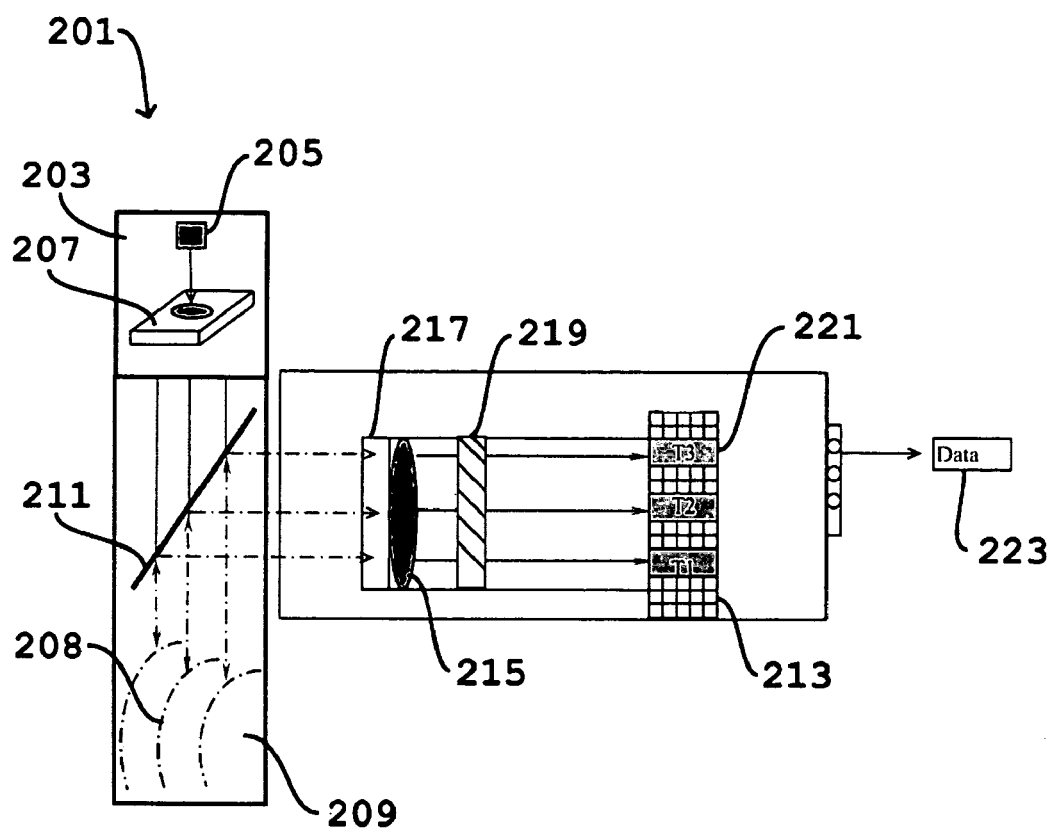
FIG. 5 is an illustration of one specific embodiment of a data retrieval system made in accordance with the teachings herein.

FIG. 5 illustrates another embodiment of a disk drive of the type disclosed herein. The disk drive 201 comprises a holographic line generating unit 203 that comprises a monochromatic or polychromatic laser source 205 and a holographic optical element 207. The holographic optical element 207 transforms the radiation from the laser source into a hologram in the form of multiple line patterns that impinge upon the data tracks 208 of the optical data storage medium 209. A one-way mirror component 211 is provided that redirects reflections from the optical data storage medium through a set off focusing optics 215, 217 and a redirecting mirror 219 and onto a detector array 213. The reflections 221 of the data tracks 208 from the optical storage media 209 are thus read by the detector.

The holographic lens element is preferably a sinusoidal line generating and/or binary phase beam splitting, diffraction grating holographic lens element. Such lens elements are available commercially from a variety of merchants. The hologram generated by these devices is a predefined image that has specific dimensions given as coordinates (x,y) which can be measured and quantified.

The disk drives disclosed herein may have one of at least two possible designs. In the first design, the line pattern or "beam" passes along an optical path including a one-way mirror before reaching the optical medium or media. Then, the holographic pattern is generated after reflecting off of the surface of the optical medium or media.

In some embodiments, a first set of focusing optics is provided to shape and size the line pattern as required by the geometry of the optical medium or media or detector. After incidence on the optical medium or media, the beam reflects and travels back the same path, or off axis a degree or so, towards a one-way mirror and passes through a holographic optical element, which segments the single line into multiple lines. The one-way mirror redirects the returning reflected signal that comes from the optical medium to a detector. A second set of focusing optics along with a redirecting mirror serve the function of spreading the beam over the sensor space of the detector as required by the sensor geometry and in such a way that the reflections of the data tracks from the data storage media are impinged upon the detector. The detector may be a CMOS or CCD detector array or the like and is preferably capable of random pixel selection with on board A-D conversion and onboard clocking.

2. Holographic Line Generating Element

The holographic line-generating element 207 is an important component of many of the disk drives and other data storage and retrieval systems disclosed herein. Line generating devices that are currently commercially available generate up to 99 lines. These translucent lenses, for the purpose of discussion relative to this subject matter, create either 1-D linear incident patterns, or a 2-D plane of equidistant incident holographic pattern, which can then be focused down to a focal plane. If the incident beam is elliptical (as with diode lasers), elliptical patterns will emerge.

Dynamically, the reflected or incident beam of the laser emerges from the HOE as a hologram divided and diverging at consistent degrees of uniformity. This holographic pattern, when focused on the surface of an optical disk or detector, provides a homogenous environment for bit pattern recognition along the disk's radius. When the data storage media comprises a plurality of stacked optical disks and this hologram is utilized, the distances between the stacked disks can be very small (e.g., on the order of 1 to 3 mm), thereby simplifying complex alignments between different optical constituents. The length of the line, the pattern required, and the number of lines is determined by the geometry of the optical disk(s) and the sensor array. Some possible line patterns that can be used are shown in FIGS. 3 and 6.

Figure 6:
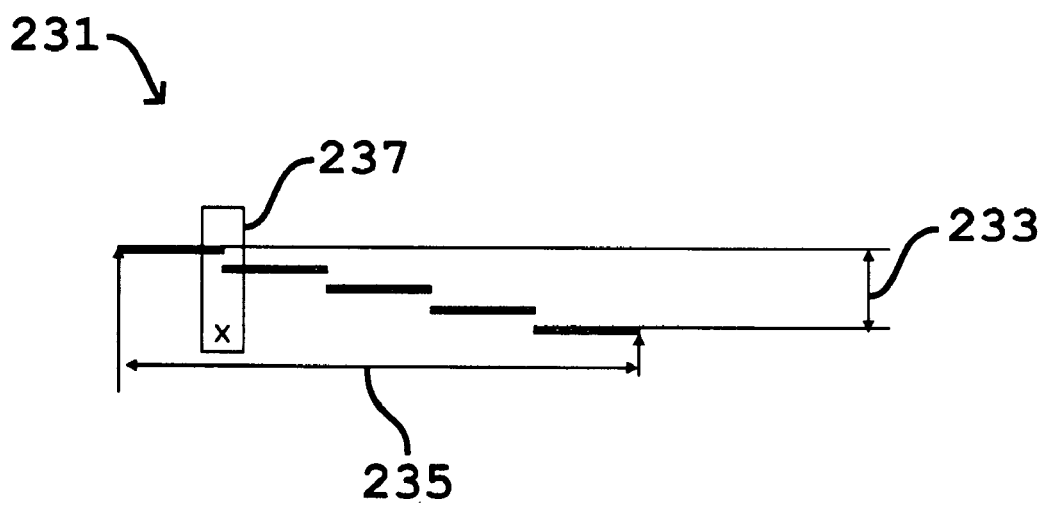
FIG. 6 is an illustration of a line pattern generated by a line generating holographic element.

With reference specifically to FIG. 6, the line pattern 231 shown therein comprises a series of lines 232 having an overall beam width 233 and an overall beam length 235. The overall beam length, width and height are variable but the beam length is preferably equal to at least the radius or diagonal of the optical disk(s). With respect to the sensor array, the length of the line may be dependent on the sensor geometry, and this factor will determine the total number of lines needed. Preferably, two adjacent lines should overlap each other (the area 237 marked X) to obtain coverage of all the lines in the optical disk(s) and to provide redundancy for error correction.

Figure 7:
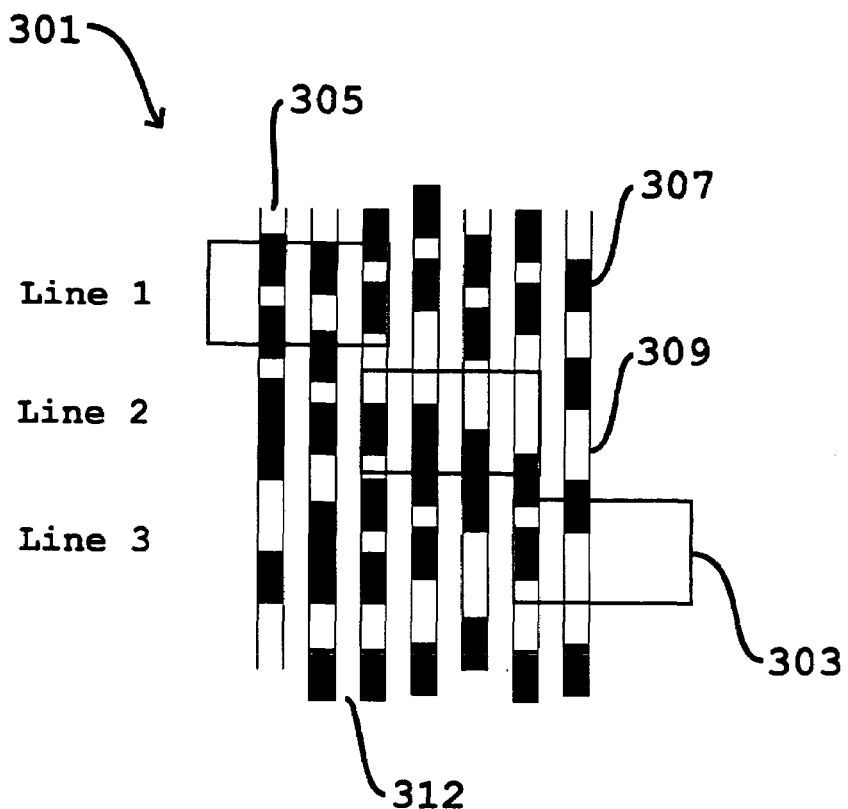
FIG. 7 is an illustration of line pattern incidence on an optical disk.
Figure 8:
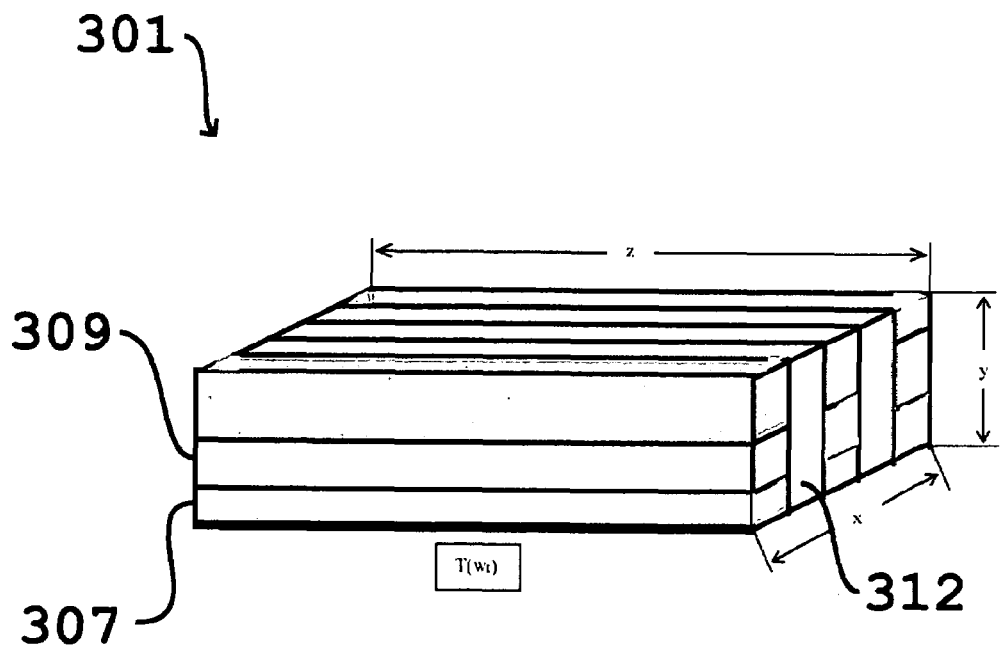
FIG. 8 is a 3D cross section of a generic multidimensional binary data signal.

The reason for this type of pattern can be appreciated with respect to FIGS. 7 and 8. FIG. 7 depicts one of many line patterns 301 incidence on an optical disk. The rectangles 303 represent segments that perpendicularly bisects the radius of the optical disk(s) and intersects its tracks. Each track 305 comprises a plurality of dark boxes 307 and white boxes 309. The dark boxes 307 indicate pits in the tracks of the optical disk(s), while the white boxes 309 represent lands. The spaces 312 between adjacent lines correspond to spaces between the tracks in the optical disk. Since the recorded area has finite dimension, multiple pits and lands are captured. The recognized bit pattern is the result of flux intensities reflected from the disk surface(s) captured within this focal plane or volume which then will be imaged and resolved on the sensor array. Since a pit disperses the incident light and the land reflects it back completely, the reflected beam is a two dimensional image of the area of incidence 303. FIG. 8 is a 3D cross section of Line 1 of FIG. 7 at incidence $T(w_t)$, where T is a function of the energy (E) delivered from the laser measured in Watts over a given time "t" measured in micro to nano seconds.

3. Distribution of Power & Loss with Signal to Noise Ratio

The laser signal by definition will lose power at each interface within the system, including the interfaces at such components as the hologram, the mirror or lens components, and the disk(s) surface. Theoretically, considering power distribution over a given area will give a general understanding of the signal and its loss function $\xi(x,y,z)$. In a typical, non-limiting set-up, the loss function is given by the integral:

$$\xi(x,y,z) = [P - \iiint H\, dx\, dy\, dz - \iiint L\, dx\, dy\, dz - \iiint D\, (R\sin\theta)\, d\theta dx\, dy] \quad \text{[EQUATION I]}$$

wherein
  $\xi$=loss;
  P=initial laser power;
  H=reflection loss at hologram;
  L=scattering loss at any lens element;
  D=scattering loss at the disk(s); and
  $R \sin\theta$=area covered by the focal plane.

It is important to note that this system is dealing with a volume of light (and hence the 3 dimensional integrals) until it strikes the disk(s). At that point, the dependence is brought down to an area with changing dθ.

The Signal to Noise Ratio (SNR) of a theoretical system is given by EQUATION 2 (representative, non-limiting values for some of the parameters in EQUATION 2 and in the succeeding equations and calculations have been provided for purposes of illustration):

SNR=AER        [EQUATION 2]

wherein
A=the area of the focus plane=65(0.9 μm×1600 μm);
E=T($w_t$)=(laser power in Watts) (time)=Joules
R=CMOS or CCD sensor array response.

4. Magnifying Optics

The reflected plane is a representation of the cross section of the optical disk(s). Each pit or land is captured as an image within this hologram. This beam will be magnified naturally as a result of the hologram before it impinges on the sensor array. The magnification of the reflected beam, which is accomplished by the nature of the hologram's creation, may be understood in reference to the following non-limiting example.

The distance between two adjacent tracks in some currently available optical disks is 1.6 microns. The track itself is only about 0.6 micron. Using 0.35 micron technology, the smallest pixel size that is currently available in the CMOS or CCD detectors is about 8–9 microns. However, the image size of a pit or a land on an optical disk is typically much smaller. This means an image of many lands and pits will be smaller than the sensor pixel size, thus necessitating magnification of the return beam.

It has been determined that, for signal processing and tracking purposes, each track on the return beam has to cover a pixel space of at least 1×2. It is thus necessary to get coverage of at least 1×2 CMOS pixels (these could also be based on CCD or another technology) per track. It will be appreciated, of course, that optimally, a 1:1 correlation is used (e.g., 1 land to 1 pixel). After the magnification, the beam goes through a second set of lenses for shaping and focusing purposes. A rough calculation indicates that the magnification has to be of the following order:

0.6 micron=track width
9 micron=pixel size
1×2 pixels=>9*2 microns=18 microns (i.e. the length of the 1×2 array).

Therefore, the required magnification is 18/0.6 or about 30×.

5. Redirecting Optics

The purpose of the redirecting optics is to align and focus all the returning lines onto a given CMOS or CCD array geometry. The length of the returning beam is equal to the radius of the optical disk(s). Unfortunately, most sensor arrays cannot cover this area. However, since the returning beam is split into many lines, it is only necessary to have a CMOS or CCD array that is as wide as the length of a hologram. All the adjacent lines can then be redirected below this line on the CMOS or CCD array.

The redirecting optics can be accomplished either by utilizing another HOE, or by utilizing a mirror component with varying reflective indices (e.g., $R_1 < R_2 < R_3 < R_4 > R_5 > R_6$, etc.). Due to these varying refractive indices, adjacent lines get focused below each other within the geometry of the CMOS or CCD. Thus, even though the angle of incidence for all the lines on the redirecting mirror is the same, due to the varying reflective indices, the angle of reflection changes. This change takes place where one track ends and the other track begins, as illustrated in FIG. 4.

6. Sensor Array

Another important element in some of the devices made in accordance with the teachings herein is the CMOS or CCD sensor array. The ability of the CMOS or CCD sensor array to pick any pixel in the sensor space within the response time of the detector is critical to the operation of optical drives made in accordance with the teachings herein. Currently, this response time is on the order of microseconds. Since accessing pixels is equivalent to accessing different tracks, optical drives made in accordance with the teachings herein will be able to switch from one track to another at the response time of the CMOS or CCD detector once the driver software has calculated which track to access. It should also be clear that multiple outputs are achievable.

The geometry of the CMOS or CCD will typically drive the other physical design considerations of optical drives made in accordance with the teachings herein. TABLE 2 shows how the array size of the detector determines the number of lines needed from the line generator. Assuming that x represents that longest dimension of the CMOS or CCD detector and that the total number of tracks is 65,000, the number of pixels required per track in the x direction is 1 pixel. Therefore total number of pixels needed in the x direction for all 65,000 tracks is 65,000×1=65,000 pixels.

TABLE 2

Number of Lines Needed From Line Generator as a Function of Array Size

| No. | No. of Pixels in the X direction | No. Of lines needed |
|---|---|---|
| 1 | 1024 | 195 |
| 2 | 1050 | 190 |
| 3 | 2000 | 100 |
| 4 | 2050 | 97 |
| 5 | 3000 | 66 |
| 6 | 3050 | 65 |
| 7 | 4000 | 50 |
| 8 | 4050 | 49 |

TABLE 2 shows that an optimum pixel size would be 3000 or 4000 pixels in the x direction. The choice of array for a particular application would depend upon such factors as the response time, signal processing capabilities, and geometry of the array. The values set forth in TABLE 2, and the subsequent calculations based on these values, are for illustrative purposes only and assume a 10 micron technology. One skilled in the art will appreciate that these numbers may change as the detector array technology evolves.

For the y direction, the number of pixels needed can be calculated as follows:

required magnification=45×
line width=9 microns
number of lines=65 for 3000 pixels in the x direction
number of lines=50 for 4000 pixels in the y direction.

Therefore, total width=20 (width)*(66 or 50) lines*45 (mag.)=59,400 microns or 45,000 microns. Assuming a pixel size of 10 microns and an inter pixel distance of 5 microns, the number of pixels in the x direction is 59,400/15 or 45/000/15=4400 pixels or 3000 pixels.
Hence, the array dimensions are 3000×44000 or 4000× 3000.

7. Signal Processing

From a processing standpoint, if all the tracks map to a specific pixel space and do not change over time, the mapping of the particular track in the optical disk(s) to a specific pixel space can be predetermined. Once this relationship is known, the mapping can be made an integral part of the software driver.

For purposes of data access, it is only necessary to monitor the pixel that corresponds to the line to be accessed. For accessing data from any track, consider a virtual read head having a 1×2 pixel window. As the optical disk(s) spins, the virtual head remains stationary while accessing, at the speed of light, virtually any or all tracks and/or bit(s) simultaneously and/or in parallel. This is accomplished by slowly incrementing the x-access line of the detector, while keeping the y access line constant until the 1×2 head reaches the edge of the detector. The 1×2 head moves along one of the line images on the CMOS or CCD array. Once the edge of the detector is reached, the y access line is incremented by a known amount to next line image on the CMOS or CCD detector which corresponds to the continuation of a track in the optical disk(s). This is equivalent to the stylus of a record player moving closer to the center of the disk(s) as the disk(s) spins. A similar effect is accomplished here using a Virtual Read Head (VRH).

One significant difference between optical drives made in accordance with the teachings herein and conventional optical disk(s) manifests itself when the drive has to access data from another line many tracks away from the current line. As noted above, a conventional drive would have to calculate the spatial distance to move the head, and then use a gear mechanism to get to that location. In optical drives made in accordance with the teachings herein, the same effect is obtained simply by applying different coordinates to the x and y by the driver software to access lines in the CMOS or CCD detector.

Since the driver software will have the mapping information for all the tracks, the only thing needed is to feed the x and y access lines with the appropriate coordinates for any given track. This makes it possible to start supplying the data almost immediately. The time required to accomplish this task is estimated to be significantly less, or at worst equal, to the time taken by current drives to compute the distance to move the read head. However, in conventional drives, the read has to then move to its required location. Since optical drives made in accordance with the teachings herein can use a VRH, this operation is eliminated.

8. Other Applications a. Parallel Reads

The novel optical drives disclosed herein enable a variety of other performance boosting mechanisms. For example, using a multi-tap CMOS or CCD detector, it is possible to do data look ahead on several tracks basically "on-line", that is, accessed concurrently or simultaneously instantaneously, prior to the VRH actually accessing that track. This facilitates burst reads as data from several tracks can be simultaneously fetched and processed in the same time it takes to process one track. The cost of processing many parallel tracks is in the processing electronics, and not in the drive heads themselves.

b. Multiple VRHs

Another function possible with optical drives made in accordance with the teachings herein is multiple, concurrent reads. The optical drives disclosed herein offer the possibility of simultaneous reads at different locations on the optical disk(s). This is equivalent to two users using the same optical disk(s) but accessing different tracks from that optical disk(s), a feat unimaginable with conventional drive technology. The real world advantage is that data requests to the drive from multiple users, to two or more different locations, need not be serialized. Rather, both the requests can be handled simultaneously.

Methodologies and devices have been disclosed herein that eliminate or reduce seek time, lower the overall costs of production and maintenance, and structure data in a real world, three dimensional matrix that results in the ability to perform complex mathematical computations that are impossible with today's one dimensional technology. The time to retrieve any amount of data is irrelevant to the amount of data to be retrieved. Moreover, these methodologies and devices provide superior parallel performance, superior data management systems and software performance, greater bandwidth, higher data transfer rates, and elimination or near elimination of input/output bottlenecks.

Although the description above contains many specificities, these should not be construed as limiting the scope of the invention, but as merely providing illustrations of some of the presently preferred embodiments of this invention. Various other embodiments and ramifications are possible within the scope of the present disclosure.

For example, the superior and more efficient means provided herein for storing, retrieving, processing and transmitting data will result in advances in medicine, scientific research and engineering. It is also evident that the devices and methodologies disclosed herein can result in substantial increases in performance in the storage, retrieval, processing and transmission of data, while also reducing long term overall costs, thus resulting in overall increases in bandwidth and lower costs. Consequently, it will be appreciated that the devices and methodologies disclosed herein will result in substantial improvements in telecommunications and networking functionality, encryption and data processing, etc.

It will also be appreciated that, while the devices and methodologies disclosed herein have frequently been described with reference to specific components (e.g., linear detector arrays, such as CMOS or CCD photo diode arrays), these components may be replaced by other components of like functionality that are presently available or that become available in the future.

What is claimed is:

1. A method for accessing data from data storage media, comprising the steps of:
   providing first and second data storage media;
   simultaneously directing electromagnetic radiation onto the surfaces of the first and second data storage media; and
   receiving, as a multi-dimensional data stream, reflections of the electromagnetic radiation from the first and second data storage media.

2. The method of claim 1, wherein the multi-dimensional data stream includes reflections of the electromagnetic radiation from both the first and second data storage media.

3. The method of claim 1, wherein the reflections of the electromagnetic radiation from the first and second data storage media are received simultaneously.

4. The method of claim 1 wherein, prior to being directed onto the surface of either of the first and second data storage media, the electromagnetic radiation is transformed into a hologram comprising a series of line patterns.

5. The method of claim 4, wherein the electromagnetic radiation is transformed into a hologram by way of a holographic lens element.

6. The method of claim 4, wherein the reflection of the hologram is captured by a CMOS or CCD photo diode array.

7. The method of claim 1 wherein, after being directed onto the surface of either of the first and second data storage media, the reflected electromagnetic radiation is transformed into a hologram comprising a series of line patterns.

8. The method of claim 7, wherein the reflection of the hologram is captured by a detector array.

9. The method of claim 1, wherein the data stream comprises binary data.

10. The method of claim 1, wherein each of the first and second data storage media has a plurality of data tracks thereon, and further comprising the step of simultaneously accessing at least one data track on the first data storage medium and at least one data track on the second data storage medium.

11. The method of claim 10, wherein the at least one data track on the first data storage medium and the at least one data track on the second data storage medium are accessed in parallel.

12. The method of claim 1, wherein each of the first and second data storage media has a plurality of data tracks thereon, and further comprising the step of simultaneously accessing a plurality of data tracks on the first data storage medium and a plurality of data tracks on the second data storage medium.

13. The method of claim 12, wherein the at least one data track on the first data storage medium and the at least one data track on the second data storage medium are accessed in parallel.

14. The method of claim 1, wherein at least one of the first and second data storage media is a static data storage device.

15. A method for generating a multi-dimensional data signal, comprising the steps of:
generating a first signal from an electromagnetic radiation source;
directing the first signal onto the surfaces of first and second static data storage media; and
receiving a second, multi-dimensional signal from the data storage media.

16. The method of claim 15, wherein the first signal bisects the surface of the first and second static storage media.

17. The method of claim 15, wherein the data captured is binary data.

18. The method of claim 15, further comprising the step of manipulating the second signal into at least two combinations of measurable parameters selected from the group consisting of length, width, height, radius, and angle.

19. The method of claim 15, further comprising the step of measuring the second signal.

20. The method of claim 15, wherein said data storage device comprises at least one static storage medium.

21. The method of claim 19, wherein the first signal bisects the at least one static storage medium.

22. The method of claim 19, wherein the at least one static storage medium comprises first and second static storage media.

23. The method of claim 21, further comprising the step of accessing multiple data tracks on the first and second storage media simultaneously and in parallel.

24. The method of claim 21, wherein the first and second static storage media comprise first and second optical disks arranged such that at least one surface of the first optical disk is parallel to at least one surface of the second optical disk.

25. A data retrieval system, comprising:
a source of electromagnetic radiation;
first and second data storage media;
a beam splitter adapted to receive electromagnetic radiation from said source and to split the electromagnetic radiation into a first plurality of beams that impinges on the first data storage medium and a second plurality of beams that impinges on the second data storage medium;
a sensor array;
a mirror; and
a holographic lens element adapted to cooperate with said mirror so as to generate a hologram in the form of multiple data patterns that are focused upon said sensor array.

26. The data retrieval system of claim 25, wherein the holographic lens element is adapted to receive electromagnetic radiation reflected from the first and second data storage media and is further adapted to generate, from the reflected electromagnetic radiation, a hologram in the form of multiple data patterns that are focused upon said sensor array.

27. The data retrieval system of claim 25, wherein said source of electromagnetic radiation is a laser source.

28. The data retrieval system of claim 25, wherein said data patterns are line patterns.

29. The data retrieval system of claim 25, wherein each of said first and second data storage media comprises a plurality of tracks, and wherein each of said data patterns corresponds to electromagnetic radiation reflected from one of said plurality of tracks.

30. The data retrieval system of claim 29, wherein said multiple data patterns include a first data pattern corresponding to electromagnetic radiation reflected from a first track on said first data storage media, and a second data pattern corresponding to electromagnetic radiation reflected from a second track on said second data storage media.

31. The data retrieval system of claim 25, wherein the first and second data storage media are optical disks.

32. The data retrieval system of claim 25, wherein the first and second plurality of beams impinge simultaneously on the first and second data storage media.

33. The data retrieval system of claim 32, wherein the first and second plurality of beams impinge in parallel on the first and second data storage media.

34. A method for accessing data from data storage media, comprising the steps of:
providing first and second data storage media having a plurality of tracks defined thereon, each of said plurality of tracks comprising a plurality of data bits;
simultaneously accessing directing electromagnetic radiation onto the surfaces of the first and second data storage media; and
receiving, as a multi-dimensional data stream, reflections of the electromagnetic radiation from the first and second data storage media.

* * * * *